Nov. 15, 1960    R. C. TOMEK    2,960,055
BOAT FENDER

Filed Sept. 10, 1958

INVENTOR
RUDOLPH C. TOMEK
BY
Mitchell Bechert
ATTORNEYS

United States Patent Office 2,960,055
Patented Nov. 15, 1960

2,960,055

BOAT FENDER

Rudolph C. Tomek, 143 Austin Ave., Tappan, N.Y.

Filed Sept. 10, 1958, Ser. No. 760,199

8 Claims. (Cl. 114—219)

My invention relates to a boat fender, and more particularly to a fender for small boats and pleasure craft in general.

Various fenders have heretofore been made; for example, some fenders have been formed of canvas sheaths filled with cork which, when placed in the water, will float horizontally on the surface. Other fenders have been formed of rubber or plastic materials which are inflated and which likewise float on the surface of the water. Inflated fenders when punctured are, of course, practically useless. Another type of fender will hang vertically in the water, but is so constructed that if it falls overboard without an attaching line, it will sink and probably be lost.

It is a general object of my invention to provide an improved form of fender which will overcome the objections heretofore noted in connection with fenders of the prior art.

It is another object to provide an exceedingly light elongated boat fender which will float upright in the water and which will not sink if it happens to be dropped overboard.

Another object is to provide an improved form of fender made of rubber, plastisol or other like plastic material which is light in weight, not subject to rapid deterioration or fouling and which will immediately right itself when placed in the water, and which will serve as a fender above, at and below the surface of the water.

It is a more specific object to provide an improved form of fender so constructed as to automatically provide and maintain an air pocket for keeping the same afloat and in a generally vertical position.

Other objects and various features of novelty and invention will be hereinafter pointed out or will become apparent to those skilled in the art.

In the drawings, which show for illustrative purposes only, a preferred form of the invention:

Figure 1:
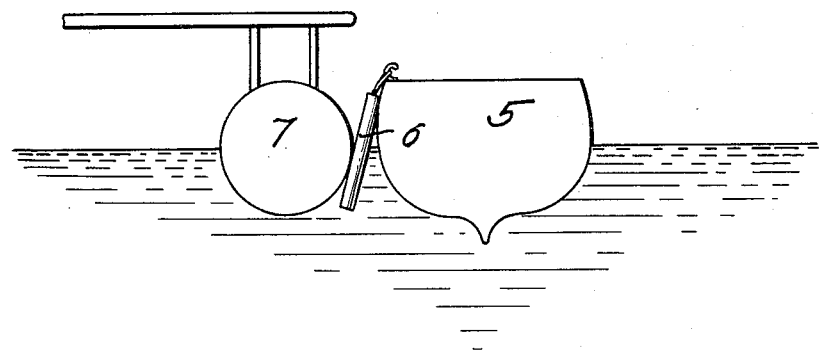
Fig. 1 is a view of a boat having one of my improved fenders for fending the same from a float.

In the view of Fig. 1 the boat 5 has a fender 6 suspended therefrom and extended down into the water so as to fend the boat from the float, and particularly the submerged portion of the pontoon 7 which supports the float deck. Thus, the particular fender shown in Fig. 1 will fend above, at and below the water-surface.

The improved fender is preferably, though not necessarily, formed of rubberlike material, such as plastisol which may be molded in various shapes and which when cured has about the characteristics of rather stiff yielding rubber so as to form a firm though yielding fender.

The fender itself, in its preferred form, consists of a generally tubular body 8 having at or adjacent the bottom a rather large opening or openings for the ingress or egress of water. In the form shown, there is a single large opening 9 in the bottom of the fender body and there is an integral stiff rim 10 defining the opening 9. The top of the body may be said to be closed, as indicated at 11 and there is an air outlet from the inside of the body at a point below the water surface, but yet in the upper part of the body so that when water enters the fender through the open bottom 9 air will be forced out, but since the top is closed and the air outlet is considerably below the water surface and in the upper part of the body, an air pocket 12 will be formed and maintained. In the form shown, this air egress passage is formed in a reentrant tubular part 13 which extends down, as shown, substantially below the water surface, and yet opens into the body at the upper part thereof. Thus, the air pocket 12 is an annular one formed between the side of the tubular body 8 and the side of the tubular reentrant portion 13.

Figure 2:
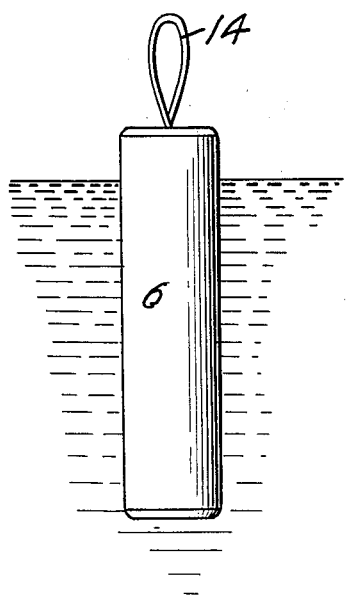
Fig. 2 is a view in elevation of a preferred form of boat fender as it will normally float when dropped into the water.
Figure 3:
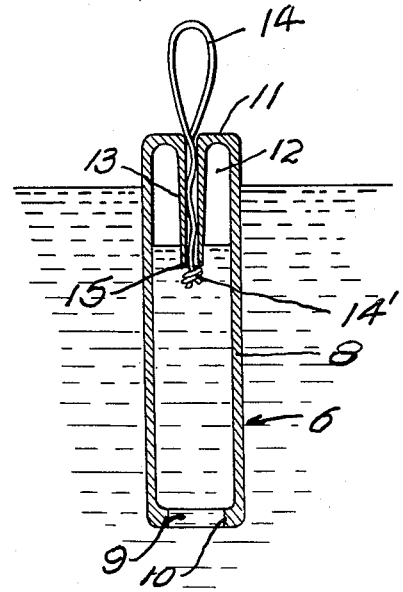
Fig. 3 is a vertical central sectional view through the boat fender shown in Fig. 2.

A securing member is fastened to the fender, and in the form shown, a loop or cord or rope, or the like, 14 has the two ends passed down through the tubular reentrant portion 13 and knotted at the bottom, as indicated at 14', to securely hold the loop in place. The cord ends do not fill the tube 13 by any means and air is free to flow through the tubular reentrant portion under proper conditions. It is highly desirable to have the bottom of the reentrant tubular portion 13 spaced from the side of the body, as indicated at 15. If the fender be thrown into the water it will normally land on its side. Air will rush out of the bottom opening 9 as water will rush in. This action will quickly right the fender and if more water rushes in through the bottom, air passes out through the tubular reentrant portion 13 until the water reaches about to the bottom of the reentrant portion 13. Thereafter little more water can enter because of the trapped air in the air chamber 12. The fender thus will be carried to float upright, as shown in Figs. 2 and 3. It will be seen that with the lower end of the reentrant portion, as shown at 15 spaced from the sides of the tubular body 8, the air can never be completely displaced from the body because the bottom sinks as soon as a relatively small amount of water enters the body and there will always be an air pocket 12 left when the water rises to the point 15 and cuts off further air escape.

Thus, if the fender is dropped overboard, it will float and may be recovered. If it is attached to the boat with a slack line, it will still float so that it will act as a fender above, at or below the water surface. A floating fender could be formed by replacing the open air pocket 12 with a light water displacing medium like confined sponge rubber or an inflated sack.

It will be seen that I have provided a very simple form of boat fender. It will be stiff enough to resist ordinary pressures between a boat and a part to be fended and the bottom rim 10 and closed top give the entire body an added stiffness. The plastic material will have long life and will not become easily fouled, and if fouled, may be readily cleaned. The fender will be light because when removed from the water, the water will quickly drain through the bottom 11 leaving only the weight of the shell and the attachments. With all, the fender is a substantial improvement over all of the fenders of the prior art with which I am acquainted.

While the invention has been described in considerable detail and a preferred form shown, it is to be understood that changes may be made within the scope of the appended claims.

I claim:

1. A fender comprising a generally tubular body member closed at the top and having passage means comprising a hollow stem portion depending from the top of the fender and communicating with the atmosphere for the egress of air leading from the interior of said tubular body below the top thereof, said body having an opening in the lower portion thereof for the ingress and egress of water, and means at the top of said fender to attach the same to a body to be fended.

2. A fender comprising a generally tubular body having an opening in a lower portion thereof for the ingress and egress of water, said body having a passage means comprising a hollow stem portion depending from the top of the fender and communicating with the atmosphere for the egress of air opening in the interior of said body at a zone away from the adjacent sides of the body and toward the upper end of the body, said body being closed at the top so as to entrap air in the upper part thereof down to the general zone of the air egress passage means.

3. A fender comprising a generally tubular body having passage means in the lower part thereof for the ingress and egress of water, said body having a closed top and a tubular reentrant portion extended inwardly from the top to a zone in the upper part of said body and opening therein at a zone generally equally spaced from the adjacent side of the tubular body, securing means extending into said tubular reentrant portion and secured therein to attach said fender to a member to be fended, said tubular reentrant portion being open sufficiently for the free passage of air from the interior of said body and whereby air will be trapped in the upper portion of said body between the top and the zone of the inner end of the reentrant portion.

4. A fender comprising a generally tubular body formed of plastic and having an open lower end for ingress and egress of water, said body being closed at the top and having a tubular reentrant portion opening to atmosphere through the top and having an opening into the interior of said tubular body at a zone in the upper part of said body below the top and generally axially of the body so as to be away from the adjacent side thereof, and whereby air will be trapped in the said upper portion of said body beneath the top and down to about the zone of the said opening into the interior of said tubular body, to cause said body to float upright.

5. The combination defined in claim 4, and a securing means extending into said tubular reentrant portion held therein for securing said fender to a body to be fended.

6. The combination defined in claim 4, wherein said open lower end of said body comprises a stiff reinforcing means to strengthen the body.

7. The combination defined in claim 4, and a length of rope-like material having its two ends projecting down through said tubular reentrant part and secured therein and leaving a loop on the outside of said body at the top.

8. A fender comprising a generally tubular body member closed at the top and having passage means in the lower part for the ingress and egress of water, said body member having air passage means opening into said body member above said first mentioned passage means for the egress of air from said body member, whereby when said body is in water it will fill with water up to about the level of said air passage means and entrap air in the said body above the level of said air passage means, said entrapped air being of a volume to displace water of a weight sufficient to buoy said fender and keep the top above water.

References Cited in the file of this patent

UNITED STATES PATENTS 1,605,102    Dryden  ---------------  Nov. 2, 1926